United States Patent [19]

Spiegel et al.

[11] Patent Number: 4,583,633
[45] Date of Patent: Apr. 22, 1986

[54] CONVEYOR FOR PACKING MACHINES

[75] Inventors: Horst Spiegel; Dieter Schubert; Manfred Woelk, all of Dresden, German Democratic Rep.

[73] Assignee: VEB Kombinat Nagema, Dresden, German Democratic Rep.

[21] Appl. No.: 631,937

[22] Filed: Jul. 12, 1984

[30] Foreign Application Priority Data

Jul. 22, 1983 [DD] German Democratic Rep. .................................. 2533086

[51] Int. Cl.[4] ...................... B65G 37/00; B65G 47/26
[52] U.S. Cl. ............................... 198/459; 198/803.01; 198/688.1; 198/465.1
[58] Field of Search ............... 198/472, 459, 731, 721, 198/473, 465.1, 465.3, 803.01, 803.2, 580, 688.1; 414/60

[56] References Cited

U.S. PATENT DOCUMENTS

| | | | |
|---|---|---|---|
| 416,404 | 12/1889 | Dunn | 198/459 |
| 2,109,301 | 2/1938 | Nakane | 198/472 |
| 2,795,861 | 6/1957 | Black | 198/472 |
| 3,057,456 | 10/1962 | Heinzer | 198/731 |
| 3,258,103 | 6/1966 | Bontempi et al. | 198/473 |
| 3,460,668 | 8/1969 | Gerrans | 198/721 |
| 3,589,497 | 6/1971 | Leach | 198/721 |
| 4,229,133 | 10/1980 | Johnson | 198/459 |

FOREIGN PATENT DOCUMENTS

| | | | |
|---|---|---|---|
| 1150021 | 6/1963 | Fed. Rep. of Germany . | |
| 84596 | 9/1971 | German Democratic Rep. . | |
| 2428618 | 11/1976 | United Kingdom | 198/792 |
| 480617 | 10/1975 | U.S.S.R. | 414/60 |

*Primary Examiner*—Joseph E. Valenza
*Assistant Examiner*—Daniel R. Alexander
*Attorney, Agent, or Firm*—Michael J. Striker

[57] ABSTRACT

In a conveyor for feeding non-slidable goods into a continuously operating packing machine, and wherein spacing between the goods being conveyed is provided by elongated engaging bars spaced from each other, a storage device is provided at the inlet portion of the conveyor. The engaging bars are discharged from the storage device onto the conveyor band of the conveyor at predetermined intervals controlled by a programming shaft of the packing machine. The engaging bars have flexible, deformable elements which are clamped between the conveyor band and clamping driven endless belts so that the engaging bars are retained on the conveyor band at predetermined intervals from each other.

7 Claims, 5 Drawing Figures

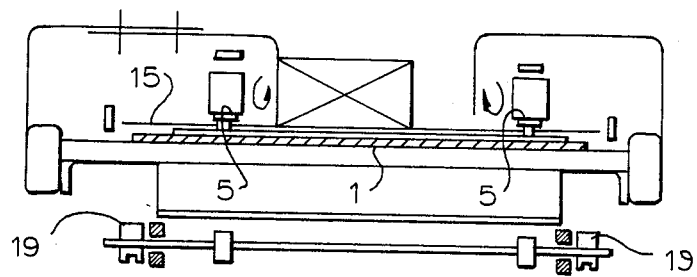
FIG. 2
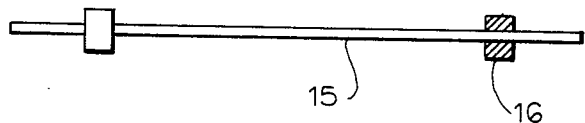
FIG. 3
FIG. 4
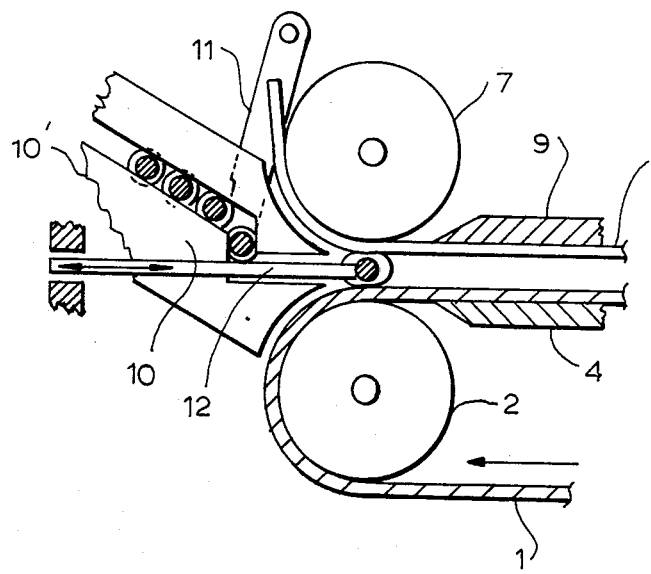
FIG. 5
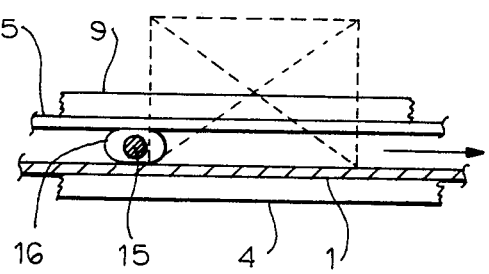

CONVEYOR FOR PACKING MACHINES

BACKGROUND OF THE INVENTION

The present invention relates to a conveyor for feeding flexible, non-slidable goods to a continuously operating horizontal packing machine.

Conveyors for feeding packing goods to a packing machine of the type under discussion have been known. Such conveyors are provided with a feeding conveyor means and with packing good-supporting means spaced from each other at adjustable distances. Conveyors for packing machines, in which a spacing between grippers can be adjusted are known, arranged in various construction forms. This adjustment of the spacing is necessary for adjusting of the conveyor to narrow formats of the goods being conveyed. The spacing between the grippers in the majority of the known conveyors cannot be adjusted in a stepless manner.

To avoid the above disadvantage it has been suggested to steer the grippers freely movable in the conveyor track by means of a star wheel driven by the packing machine. Such a construction has been disclosed in West German Pat. No. 11 50 021.

The grippers in the aforementioned publication are controllable in a continual or stepless fasion; however the disclosed conveyor is suitable only for slidable goods because the goods being fed towards the packing machine must slide along the extent of the conveyor.

The conveyor, in which flexible goods are layed on the conveyor band at uniform intervals from each other has been disclosed in East German publication No. DD-WP 84 596. In this construction, goods being fed towards the packing machine have been brought on the inclined roller track unless they reach a specific stop member. This stop member is pivotable outwardly together with the roller track portion positioned shortly before the end of the roller track. The pivoting movement of the stop member together with the portion of the roller track in the upward direction has been caused by the rotation of a single revolution shaft of the collecting packing machine, whereby the front portion of the commodity being fed could slide onto the conveyor band. The following commodities have been at this point retained. Only stowable goods could be separated by the above disclosed conveyor. Since it was impossible to mechanically separate non-slidable or non-stowable, goods packing machines known at the present time have been operated with intermissions to enable an operator to lay the goods being conveyed onto the conveyor band by hand. Supporting strips, which must be displaced when the format of the good being conveyed by the conveyor is changed, have served as orienting elements. The output of these known machines is, however, limited because of the standstill periods in the working cycle of the packing machine.

SUMMARY OF THE INVENTION

It is an object of the present invention to provide an improved conveyor for feeding goods to a packing machine.

It is another object of the present invention to provide a conveyor for feeding non-slidable goods to a packing machine in which an effective and controllable packing would be ensured by mechanically-operated means.

It is still another object of this invention to provide a conveyor which would make possible a feeding of flexible, non-slidable and mechanically non-separable goods to a continually operating packing machine, as well as the adjustment of the conveyor to a change of a format of a good being fed, to the packing machine.

These and other objects of the invention are attained by a conveyor for feeding flexible, non-slidable goods to a continuously operating, horizontal packing machine having a programming shaft, comprising conveying means for conveying goods positioned thereon; means for engaging individual goods on said conveying means and positioned at an adjustable distance from each other; said conveying means including a transport band continuously running with a speed corresponing to the speed of a packing medium, said transport band having a start portion and a discharge portion, storage means for storing said engaging means, said storing means being positioned at said start portion and including locking elements controllable by said programming shaft to open or close said storage means to discharge therefrom said engaging means at predetermined intervals from each other onto said transport band; clamping means arranged above said transporting means and operative for retaining said engaging means at predetermined intervals on said transport band; and means for returning said engaging means from said transport band to said storage means, said returning means being positioned below said transport band.

The clamping means may include two endless clamping belt conveyors spaced from each other above said transport band and being spaced therefrom, and pressing strips, each of said belts having a lower strand, which is supported by a respective pressing strip.

The engaging means may include a plurality of elongated bars extended on said transport band transversally thereof.

Each bar has two ends, and may be provided with elastically deformable elements at said ends, said clamping belts being pressed against said deformable elements to retain said bars at predetermined intervals from each other.

The returning means may include a pair of transport chains provided with grippers engageable with said bars and a guide for receiving said bars from said transport band and guiding said bars along said chains.

The guide may have a sloped portion arranged at said discharge portion.

The storage means may include an inclined guide positioned between said returning means and said start portion of said conveyor band. Since the conveyor band runs with the speed of running of the packing medium, the packing good can also be brought on the packing medium in a continuous operation, without any distortions. The packing machine, which controls the release of the engaging bars from the storage means by the operation of the programming shaft, ensures that the exact spacing between the engaging bars corresponding to the rhythm of the packing is warranted, and the exact position of the engaging bars on the conveyor band and clamping of those engaging bars between the clamping belts and the upper strand of the conveyor band is possible. Thereby non-slidable goods can be continuously packed, which considerably increases the output of the packing. Inasmuch as the release of the engaging bars is controlled by the programming shaft of the packing machine, any adjustment of the conveyor to a changed format of the good to be conveyed is problemless and requires no additional labor consumption.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a schematically shown sectional view taken on line II—II of FIG. 1;

FIG. 3 is a side view of the engaging bar;

FIG. 4 is a detail IV of FIG. 1; and

FIG. 5 is a detail V of FIG. 1.

DETAILED DESCRIPTION OF THE PREFERRED EMBODIMENT

Figure 1:
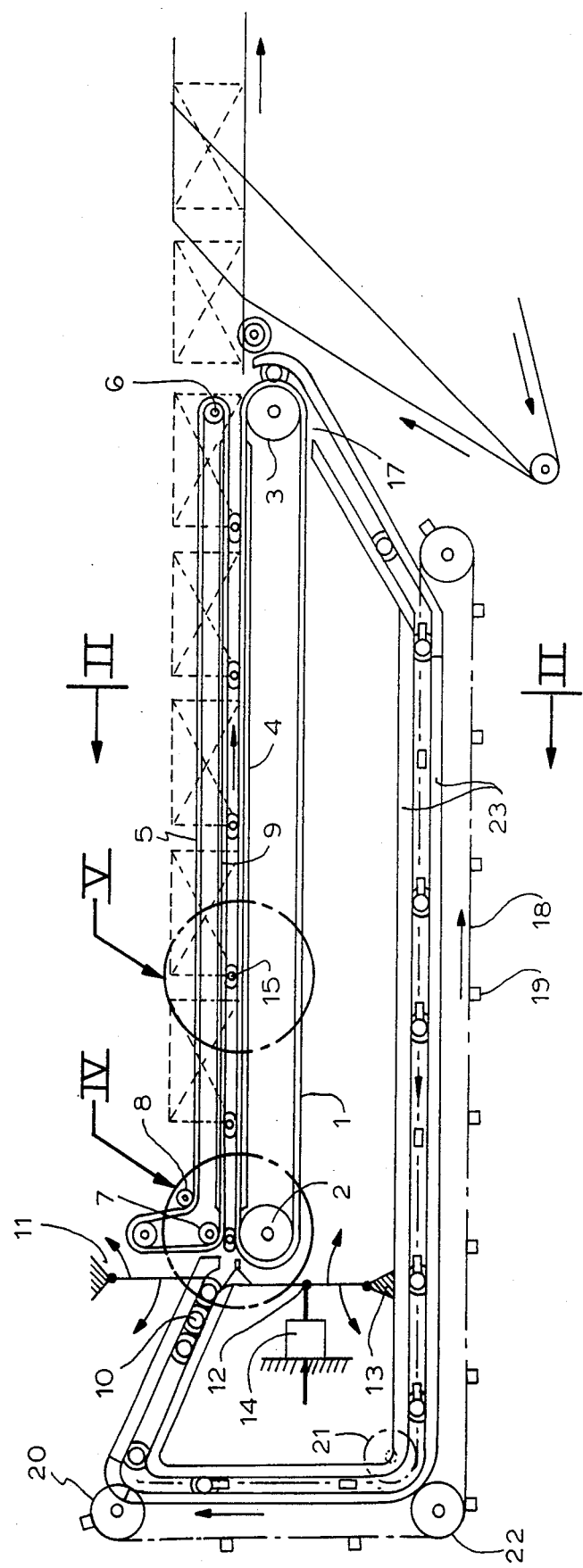
FIG. 1 is a schematic side view of the conveyor according to the invention.

Referring now to the drawings in detail, and firstly to FIG. 1 thereof, it will be seen that the conveyor for feeding flexible, non-slidable goods to a continuously operating horizontal packing machine includes a transport band 1 which is guided over a deflection roller 2 and a drive roller 3. The drive for roller 3 is drawn off the drive of the track of the packing medium, whereby the speed of the packing medium and that of the transport band will be always the same. The upper strand of the transport band 1 runs on a supporting plate 4. Over the edges of the upper strand of transport band 1 and at a small distance therefrom are mounted clamping belts 5. As can be seen from FIG. 2 two clamping belts 5 are provided in the conveyor. The clamping belts 5 have the same length as that of transport band 1. The front deflection roller 6 of each clamping belt 4 serves as a drive roller. The drive of the clamping belts is branched off the drive of the transport band 1. On the inlet ends of each clamping belt 5 are arranged two superimposed deflection rollers 7 and a tension roller 8. The lower strand of each clamping belt 5 is supported by means of a pressure strip 9. Before the transport band or conveyor 1 and clamping belts 5 in the direction of feeding of goods being transported, is mounted a storage device 10 for storing engaging means which are bars 15 in the exemplified embodiment. Each bar 15, as seen from FIG. 5, is engaged with the end face of the good being conveyed by the conveyor band 1. This storage device is comprised of guide pairs 10' inclined rearwardly and directed upwardly and extended at two sides of the conveyor in the planes of the edges of the conveyor band 1. The lower front ends of guide pairs 10' open above the inlet of the transport band 1 and are closable by locking detents or latch members 11. The locking members of the guide pairs 10' are connected to a pendulum element 12 which is supported on a pivot bearing 13. Pendulum or oscillating element 12 is actuated by an electromagnet 14 which oscillates the latter. Bars or rods 15 are inserted between the guide pairs 10'. Bars 15 are provided at their ends with fixing elements 16, which are elastically deformable. An inlet slope or inclination device 17, formed of pairs of spaced guides, which open with their lower ends above a transport chain pair 18, is arranged at the outlet or discharge end of the transport band 1. Transport chains 18 are provided with grippers 19 spaced from each other along the track of each chain. At the inlet end of transport band 1 the transport chain pair is guided upwardly over deflection rollers 20, 21 and 22 in such a fashion that the ends of the chain pair open into the inlet of the storage device 10. Laterally of the transport chain pair 18 are positioned guides 23 spaced from each other for guiding therebetween engaging bars 15.

The synchronism of packing in the packing machine is controlled in the known fashion by a programming shaft which is not shown herein. Depending on the adjusted speed of the packing medium a number of revolutions of the programming shaft corresponds to the length of packing. Upon the start of the packing machine a pulse for actuating of electromagnet 14 will be released in accordance with each rotation of the programming shaft, and thereby by means of locking elements 11 and oscillating pusher 12, a bar 15 will be removed and pushed out from the storage device or magazine 10. Bar 15 is then pushed onto transport band 1 by the clamping belts 5. Because of the deformability of fixing elements 16 on bars 15 these fixing elements will be pressed flat, whereby the displacement of the bars on the conveyor band will be excluded. In the event of changing a format of the packing medium (length of a bag), an angle-depending correction of a slide-in time point on the programming shaft is undertaken according to the corrections in the packing machine.

Between the engaging means, which are engaging bars 15, goods being packed can be readily inserted by hand or in a mechanically-controlled fashion. In the instance of the mechanical control an operator can easily rearrange goods if they are not exactly positioned. Bars 15, while being engaged with clamping belts 5, are uniformly spaced from each other as can be seen from FIG. 1. Bars 15 at the end of transport band 1 are released from clamping belts 5. By means of inlet inclination device or guides 17, bars 15 roll onto the transport chain pair 18, by which they are guided towards the storage device 10. If a format of the packing medium is to be changed only a re-adjustment of the programming shaft of the packing machine is carried out and the conveyor is thereby adjusted to new working conditions.

Programming shafts in the packaging machines to control their operations are disclosed, for example, in the West German patent publication No. DE-OS 2627 131.

It should be realized that the constructions of the clamping belts, conveyor band, transport chains provided with grippers cooperating with rolling bars are known and therefore are not described herein in detail.

It will be understood that each of the elements described above, or two or more together, may also find a useful application in other types of conveyors for feeding non-slidable goods towards packing machines differing from the types described above.

While the invention has been illustrated and described as embodied in a conveyor for feeding flexible non-slidable goods towards a packing machine it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A conveyor for feeding goods to a continuously operating, horizontal packing machine having a programming shaft, comprising conveying means for conveying goods positioned thereon; a plurality of means for engaging individual goods on said conveying means and positioned at an adjustable distance from each other; said conveying means including an endless conveyor band continuously running with a speed corresponsing to the speed of the packing machine, said conveyor band having a beginning portion and a discharge portion; storage means for storing said engaging means, said storage means being positioned at said beginning portion and including locking elements controllable by said programming shaft to open or close said storage means to discharge therefrom said engaging means at predetermined intervals from each other onto said conveyor band; clamping means including two endless clamping belts arranged above said conveyor band and being spaced therefrom and operative for retaining said engaging means at predetermined intervals on said conveyor band, said storage means further including an oscillating pusher controllable by said programming shaft and adapted to push said engaging means from said storage means into a space between said clamping belts and said conveyor band; and means for returning said engaging means from said conveyor band to said storage means, said returning means being positioned below said conveyor band.

2. The conveyor as defined in claim 1, wherein said clamping means further include deflection rollers, said two endless clamping belts being guided over respective rollers and spaced from each other, and pressing strips, each of said endless clamping belts having a lower strand which is supported by a respective pressing strip.

3. The conveyor as defined in claim 2, wherein said engaging means include a plurality of elongated bars extended on said conveyor band transversally thereof.

4. The conveyor as defined in claim 3, wherein each bar has two ends and may be provided with elastically deformable elements at said ends, said clamping belts being pressed against said deformable elements to retain said bars at predetermined intervals from each other.

5. The conveyor as defined in claim 4, wherein said returning means includes a pair of transport chains provided with grippers engageable with said bars, and a guide for receiving said bars from said conveyor band and guiding said bars along said chains.

6. The conveyor as defined in claim 5, wherein said guide has a sloped portion arranged at said discharge portion.

7. The conveyor as defined in claim 5, wherein said storage means includes an inclined guide positioned between said returning means and said beginning portion of said conveyor band.

* * * * *